United States Patent [19]
Follmer

[11] Patent Number: 5,809,914
[45] Date of Patent: Sep. 22, 1998

[54] AGRICULTURAL IMPLEMENT WITH PIVOTING CARRIER FRAME

[76] Inventor: Richard L. Follmer, R.R. #1, Box 17, Hudson, Ill. 61748-9704

[21] Appl. No.: 739,941

[22] Filed: Oct. 30, 1996

Related U.S. Application Data

[60] Provisional application No. 60/015,182 Apr. 5, 1996.

[51] Int. Cl.⁶ ........................................... A01C 5/00
[52] U.S. Cl. .................... 111/56; 111/59; 172/325; 172/456; 172/485
[58] Field of Search ................... 111/52, 63, 144, 111/53, 54, 56, 57, 59, 925; 172/325, 324, 326, 452, 456, 662, 668, 675, 485

[56] References Cited

U.S. PATENT DOCUMENTS

| | | | |
|---|---|---|---|
| 2,297,938 | 10/1942 | Briscoe | 172/325 X |
| 3,608,645 | 9/1971 | Meinerrs | 111/925 X |
| 4,572,087 | 2/1986 | Brannan | 172/325 X |
| 5,343,958 | 9/1994 | Kromminga et al. | 111/925 X |

FOREIGN PATENT DOCUMENTS

| | | | |
|---|---|---|---|
| 2517264 | 10/1976 | Germany | 111/56 |
| 192518 | 4/1967 | U.S.S.R. | 172/325 |

*Primary Examiner*—Michael J. Carone
*Assistant Examiner*—Christopher J. Novosad
*Attorney, Agent, or Firm*—Emrich & Dithmar

[57] ABSTRACT

An agricultural implement includes a forward implement frame and an aft carrier frame with wheels, with the two frames pivotally connected. The implement frame includes a hitch mechanism for attaching the implement to a traction vehicle, while a toolbar having a plurality of working units, such as ground working tools or spraying units, arranged in a spaced manner along its length is attached to an aft portion of the implement frame. Attached to the carrier frame is a storage container for dispensing material such as fertilizer or a herbicide. A forward portion of the carrier frame is pivotally coupled to an intermediate portion of the implement frame. A lift arrangement including a pair of hydraulic cylinders connecting the implement and carrier frames is located aft of the pivot connection between these two frames and permits the toolbar and working units to be raised to a nonuse position such as for transport or at the end of a field without lifting the storage container and its contents. The center of gravity of the storage container is preferably forward of the support wheels for exerting a downward force on the toolbar and working units. Adjustable linkage is provided for leveling the toolbar when in the lowered, use position. Left and right wing sections extend outwardly from the toolbar and also have working tools attached thereto. The wing sections are adapted for forward pivoting displacement to a nonuse position such as for transport or storage by a pair of hydraulic cylinders.

12 Claims, 8 Drawing Sheets

AGRICULTURAL IMPLEMENT WITH PIVOTING CARRIER FRAME

RELATED APPLICATION

This application claims the benefit of copending U.S. provisional application No. 60/015,182, filed Apr. 5, 1996.

FIELD OF THE INVENTION

The present invention relates to agricultural implements; and more particularly it relates to an improved frame for an agricultural implement of the type wherein a large amount of dispensable material is carried on the frame, in addition to tools or other working units. The invention is useful for agricultural fertilizer applicators, sprayers and the like, and it may be adapted to other implements, such as planters, where large amounts of particulate material (i.e., seeds) is required to be stored for dispensing.

In implements of this type, in general, the chemical, fertilizer or seeds are generally carried on the same frame as the toolbar to which the ground working tools or spraying units are mounted. Thus, in the case of an implement mounted to a tractor 3-point hitch, the storage container for the dispensable material is normally lifted along with the work units for turning at the end of the field or for road transport.

The present invention does not mount the storage container for the dispensable material on the toolbar or on the toolbar frame. Rather, it is mounted on a separate carrier frame which is pivotally mounted (i.e., hinged) to the toolbar frame (or implement frame, as it is sometimes called), in such a manner that the working units can be raised to a field-turn position, or for road transport, without lifting the storage container and its contents.

The invention consists of certain novel features and a combination of elements hereinafter fully described and illustrated in the accompanying drawings, it being understood that various changes in the details or substitutions may be made without departing from the spirit, or sacrificing any of the advantages of the present invention.

DETAILED DESCRIPTION OF A PREFERRED EMBODIMENT

Figure 1:
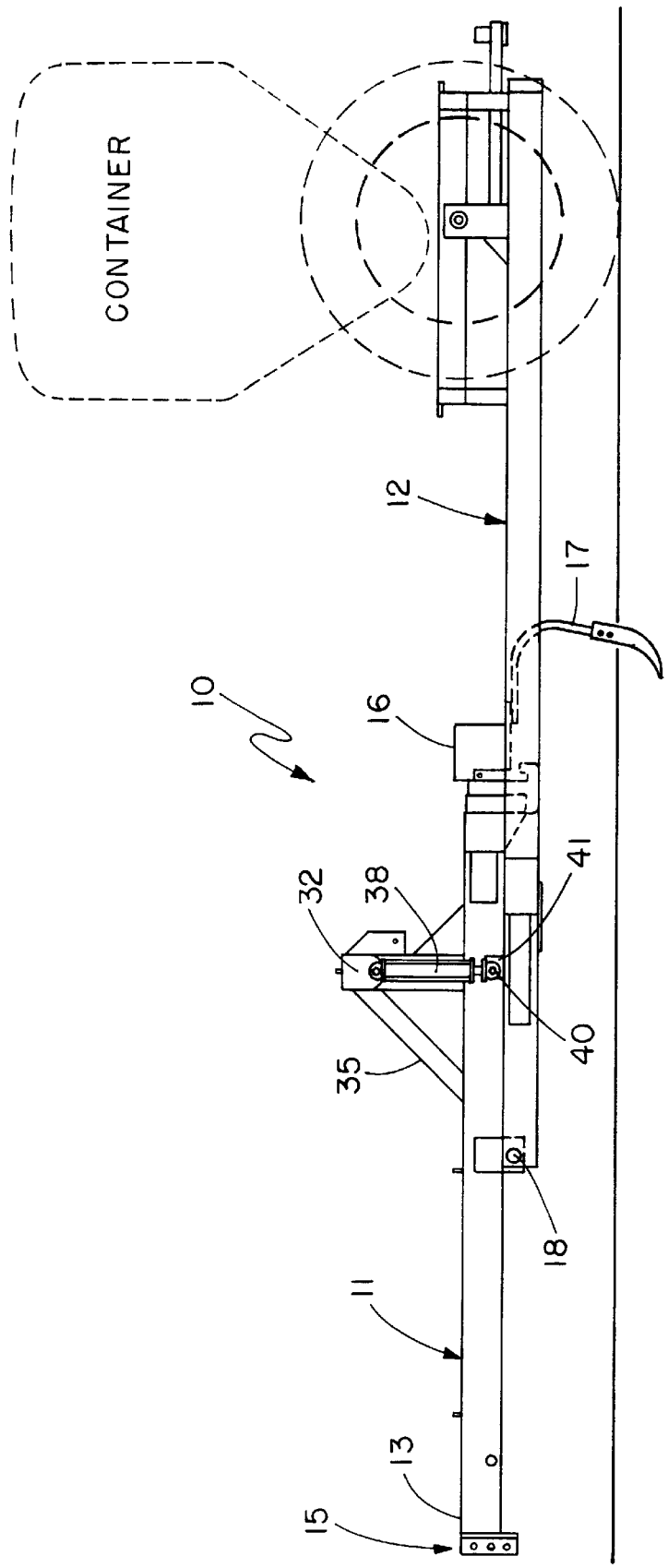
FIG. 1 is a left side view of an implement frame constructed according to the present invention.

Referring first to FIG. 1, reference numeral 10 generally designates an agricultural implement incorporating the present invention. The implement 10 includes an implement frame 11 and a carrier frame generally designated 12, connected to the implement frame 11 by a hinge to be described, and extending behind it.

Turning first to the implement frame 11, it includes, at its forward end 13, a conventional hitch 15 adapted to be connected to a drawbar of an agricultural tractor.

At the rear end of the implement frame 11, there is mounted transverse tubular frame member 16, or "toolbar" as it is sometimes referred to. The toolbar 16 is removably attached to the implement frame 11, as will be described below, and it carries a plurality of laterally spaced tools or work units, an example of which is seen at 17 in FIG. 1, in the form of a fertilizer knife for applying granulated fertilizer.

Thus, the implement shown in the drawing is adapted for application of fertilizer, but the invention could equally well be adapted for other implements, such as planters wherein the toolbar would carry individual row units, or sprayers, wherein the toolbar would carry individual, laterally spaced spraying units, which need not engage the ground.

The forward end of the carrier frame 12 is hinged at 18 to an intermediate location on the underside of the implement frame 11.

Figure 4:
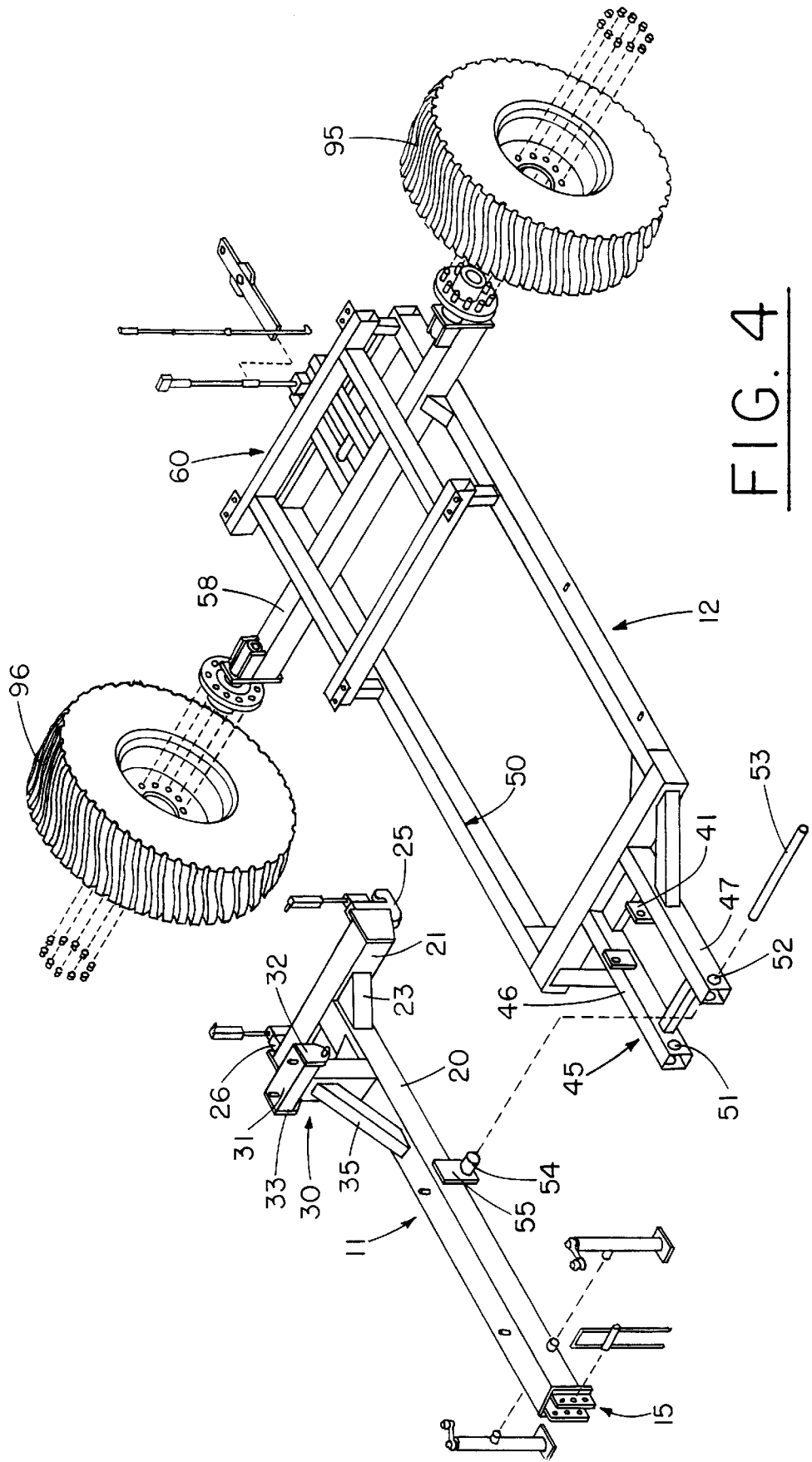
FIG. 4 is an upper isometric view taken from the front, left side of the implement frame with some components in exploded relation.

Turning now to FIG. 4, the implement frame 11 includes an elongated tubular frame member 20 which extends longitudinally from the hitch 15 rearwardly to a transverse tubular frame member 21 which is welded to the rear of the longitudinal frame member 20, and braced thereto by a pair of gusset sections, one of which is designated 23 in FIG. 4. At the rear surface of the transverse frame member 21 there are mounted a pair of J-shaped mounts, 25, 26 for receiving mounting rods attached to the toolbar 16 (see rod 27 in FIG. 6). The toolbar itself may be conventional, as is the mounting for the tools and the tools themselves. The J-mounts 25, 26 form a conventional quick-connect for the toolbar 16, permitting other implements or toolbars of different working widths readily to be installed on the implement frame.

An hydraulic cylinder mount generally designated 30 in FIG. 4 is welded to the top of the longitudinal frame member 20. The cylinder mount 30 is in the form of an upright T, having an upper transverse member 31 with mounting plates 32, 33 secured to the sides thereof. The T-shaped portion is braced by a diagonal member 35.

The butt ends of a pair of hydraulic cylinders 38, 39 (see cylinder unit 38 in FIG. 1), are pivotally mounted respectively to the mounting plates 32, 33. As seen in FIG. 1, the rod end of the cylinder 38 is pivotally mounted at 40 to a mounting tab 41 welded to the carrier frame, as will be described below, but which can be seen in FIG. 4.

Still referring to FIG. 4, the carrier frame 12 includes a forward mounting section 45 including laterally spaced, longitudinal frame members 46, 47 which are welded to the forward portion of a larger, rectangular frame section generally designated 50. The forward ends of the frame members 46, 47 are provided with laterally aligned sleeves 51, 52 for receiving a main pivot rod 53 which extends through a sleeve or bushing 54 welded to the longitudinal frame member 20 of the implement frame 11 by means of a pair of mounting plates, one of which is designated 55 in FIG. 4. The frame members 46, 47 of the carrier frame 12, of course, straddle the longitudinal frame member 20 of the implement frame, and the pivot pin 53, thus forms the previously-mentioned hinge or pivot 18 which is the main hinge connection between the two frames.

The tubular frame section 50 extends well to the rear of the toolbar, as seen in FIG. 1, and is supported by a pair of ground support wheels 95, 96 mounted to conventional wheel hubs which, in turn, are mounted to a main axle 58 which is mounted to the rear of the rectangular frame section 50 of the carrier frame 12.

Mounted above the main wheel axle 58, and extending fore and aft of it is a base or platform generally designated 60. The platform 60, sometimes referred to as a cargo rack, is intended to support a container for storing dispensable material. The container may be a hopper, in the case of particulate fertilizer, or it may be a pressurized, enclosed tank, in the case of liquid fertilizer, herbicide or other liquid chemicals. The container may also be a large, central hopper with an openable lid for storing seeds.

Figure 2:
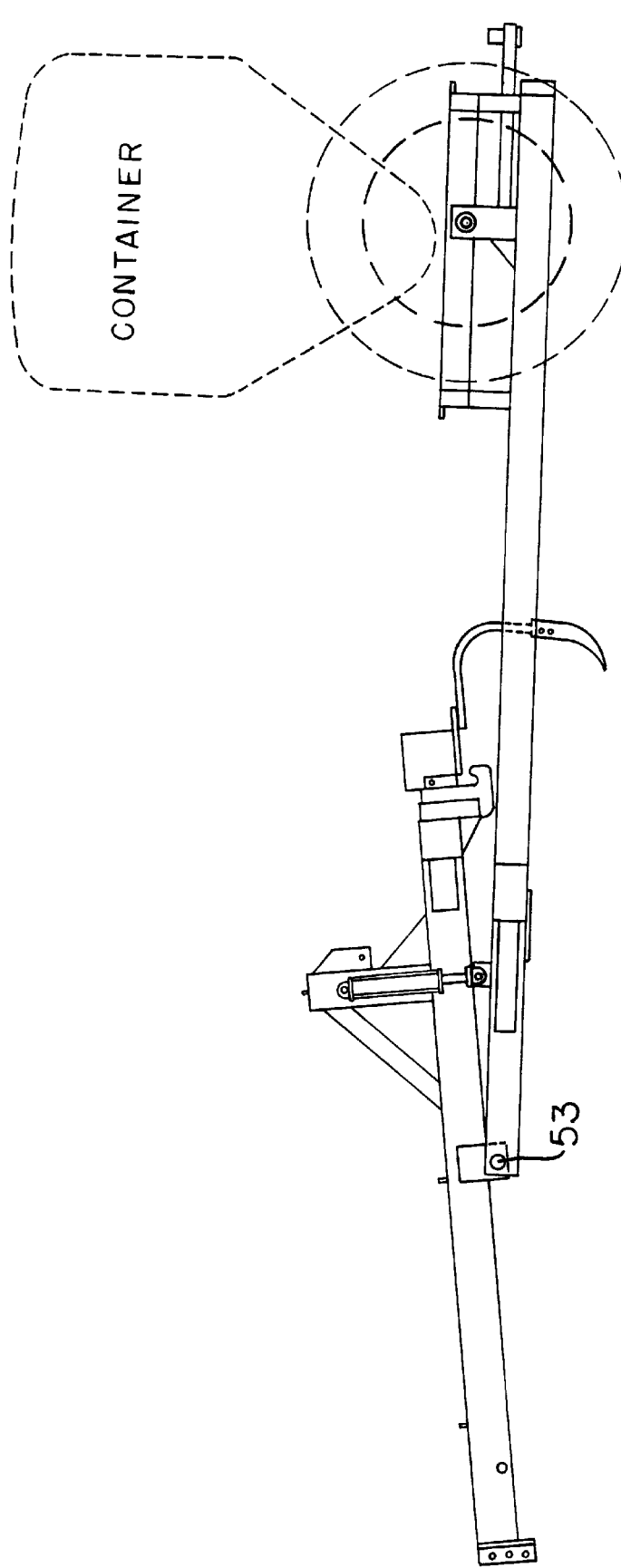
FIG. 2 is a view similar to FIG. 1 with the main frame raised slightly to move the working units to an intermediate position.
Figure 5:
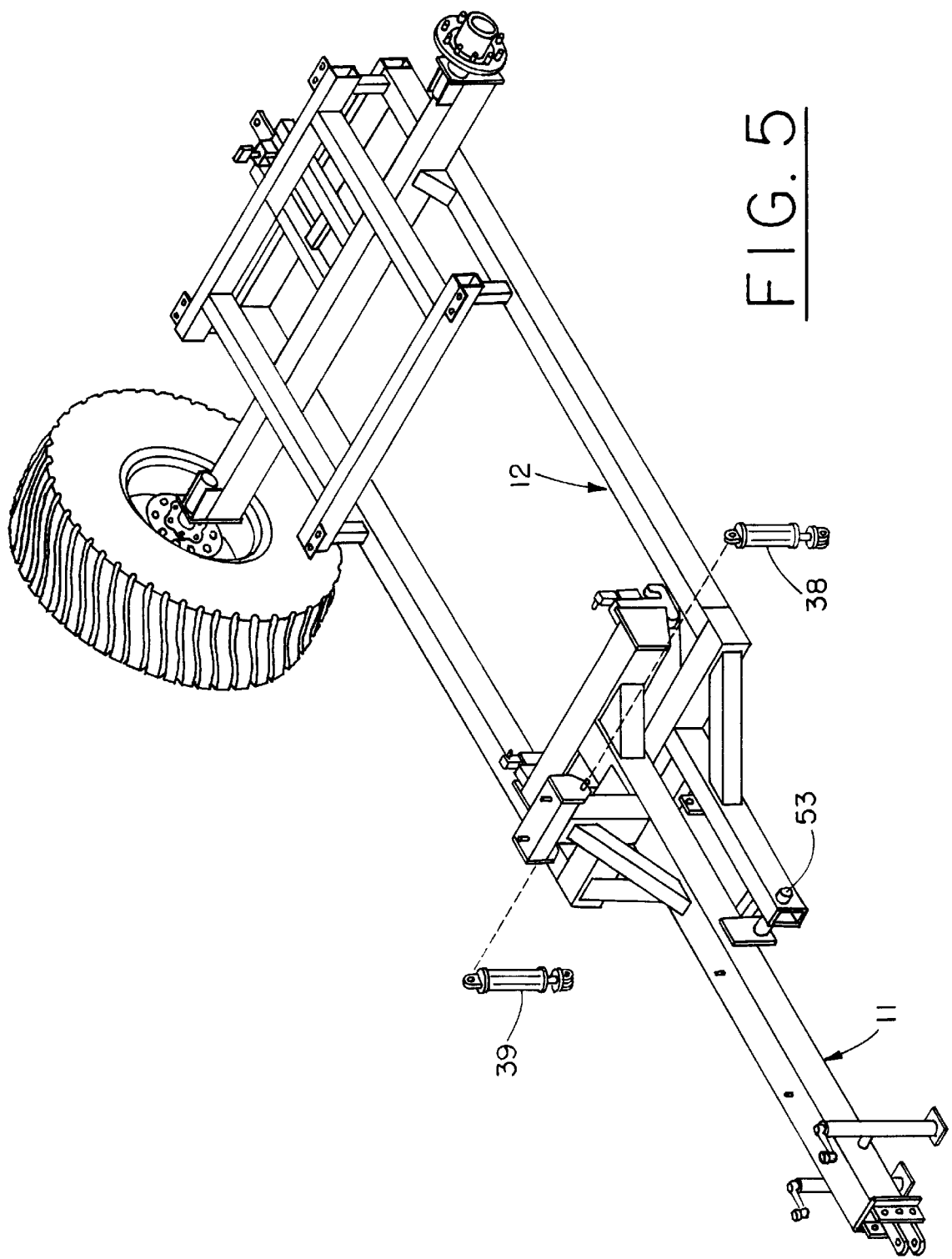
FIG. 5 is a view similar to FIG. 4 with the components in assembled relation, but with the left rear tire removed for clarity.

The frames are shown in assembled relation in FIG. 5, and the hydraulic cylinders 38, 39 are spaced from their respective mountings for clarity. The hydraulic cylinders 38, 39 are connected in parallel hydraulic circuit. When the hydraulic cylinders are extended by forcing hydraulic fluid under pressure into the butt ends of the cylinders, the rear end of the implement frame 11, as well as the toolbar mounted thereon, are raised so that the work units are above the ground as in FIG. 2; and this position may be useful in disengaging the work units at the end of a field swath for turning the implement around. It will be observed that the container, shown in phantom, is not lifted when the work units are raised to a non-working position. Rather, the weight of the container and its contents are borne by the ground support wheels 95, 96. It is preferred that the center of gravity of the container and its contents be located forwardly of the axis of the main wheel axle for ground support wheels 95, 96. This ensures that there will always be a downward force on the forward end of the carrier frame 12, and this, in turn, ensures that there will always be a downward force on the implement frame 11 induced by the pivot pin 53. This is considered to be significant because when it is desired to move the implement from the position of FIG. 2 back to the field use position of FIG. 1, by causing the work units to re-enter the soil, it is desirable to have a substantial downward force on the work units, particularly in the case of hard or dry soil. In the illustrated embodiment, not only is the "tongue weight" of the carrier frame 12 exerted at a mid-point (pivot 18) on the implement frame 11 to urge the tools in the working position, but the weight of the toolbar and work units, and the force of the hydraulic cylinders 38, 39 also provide a downward force on the working implements when the implement frame is being lowered to the use position.

Figure 3:
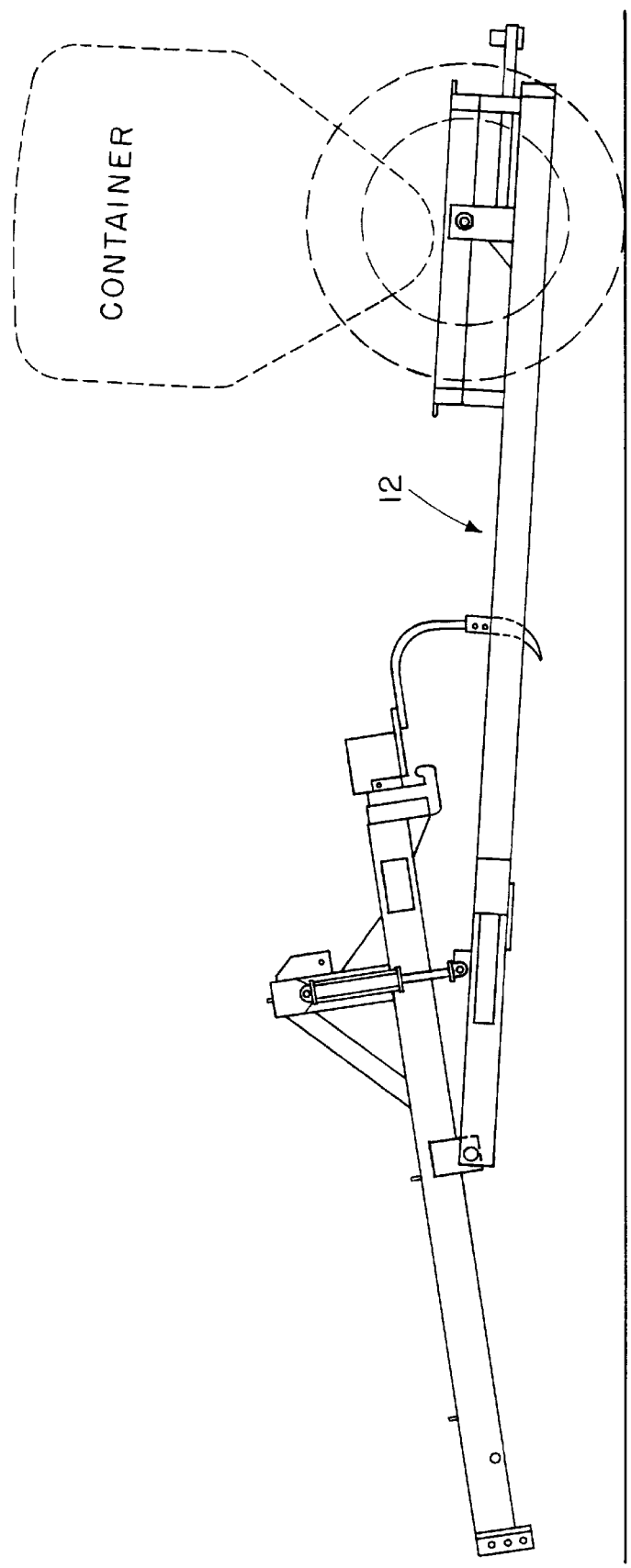
FIG. 3 is a view similar to FIG. 2, but with the main frame raised to the road travel position.

Turning now to FIG. 3, when the hydraulic cylinders 38, 39 are fully extended, the tools are raised substantially above the soil level, as for road transport, but it will also be observed that the weight of the container and its contents is still being borne by the rear ground support wheels on the carrier frame 12.

Figure 6:
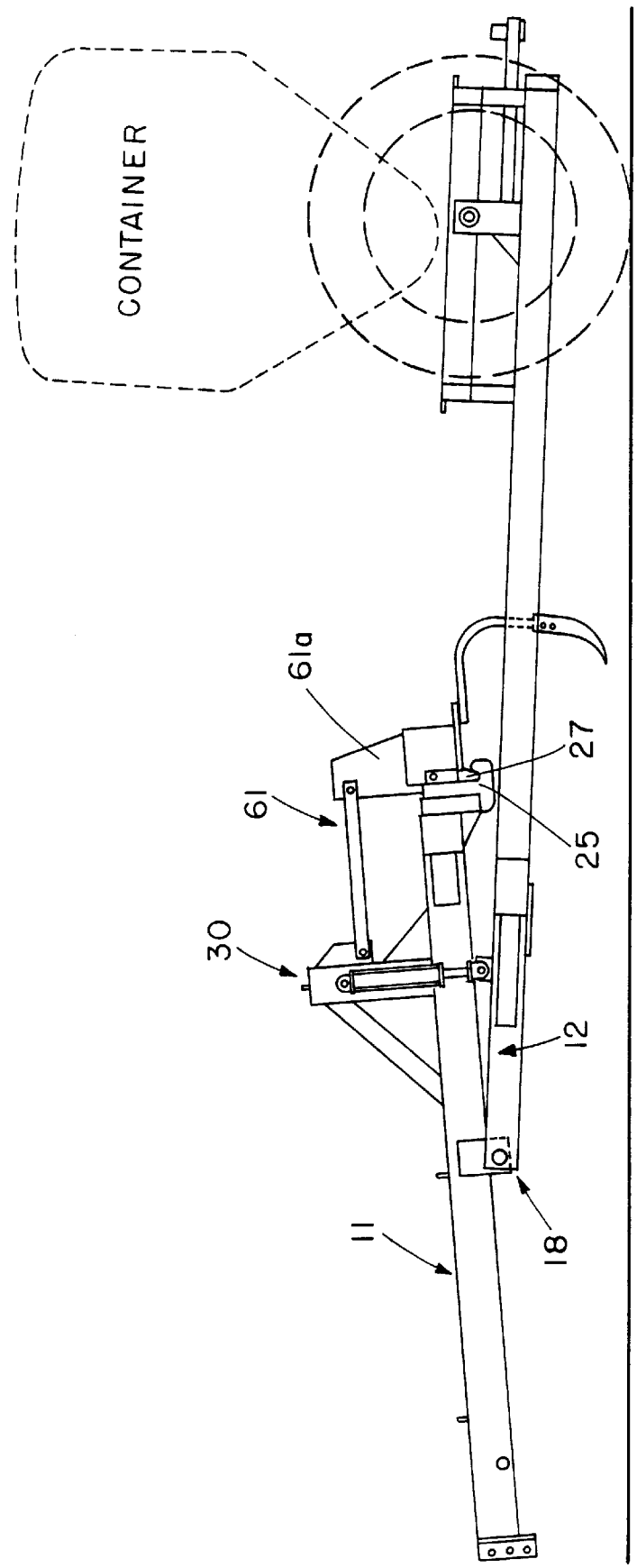
FIG. 6 is a left side elevational view of an implement frame constructed according to the present invention with an adjustable link for leveling the toolbar.

As seen in FIG. 6, an adjustable link 61 may be connected between the cylinder mount 30 and a plate 61A welded to toolbar 16 for leveling the toolbar, if desired. The link 61 may be a center screw with reverse threads at each end, received in correspondingly threaded tubular receptacles.

Figure 7:
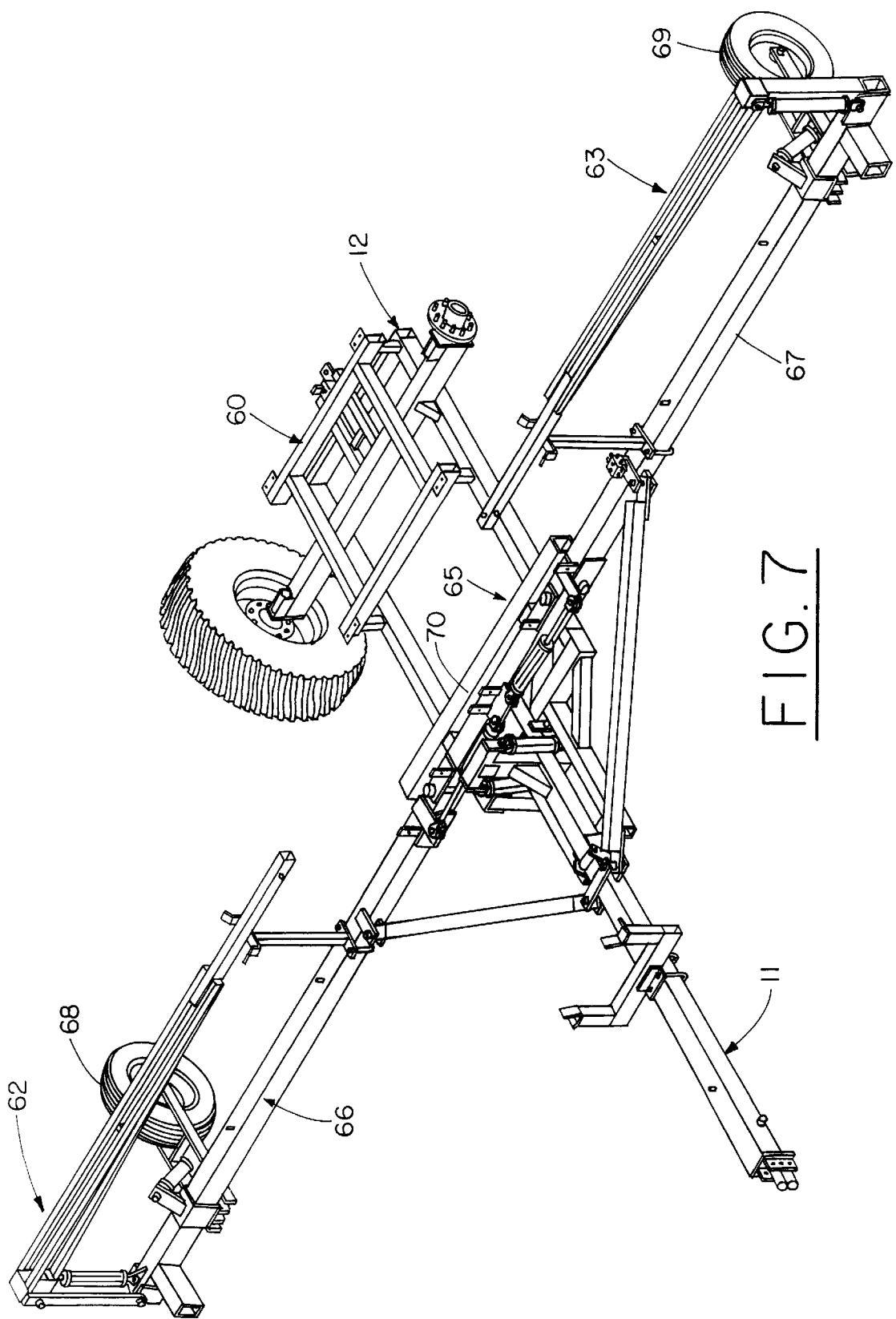
FIG. 7 is an isometric view, taken from the front left side of an implement frame with folding wing sections, and constructed according to the present invention.
Figure 8:
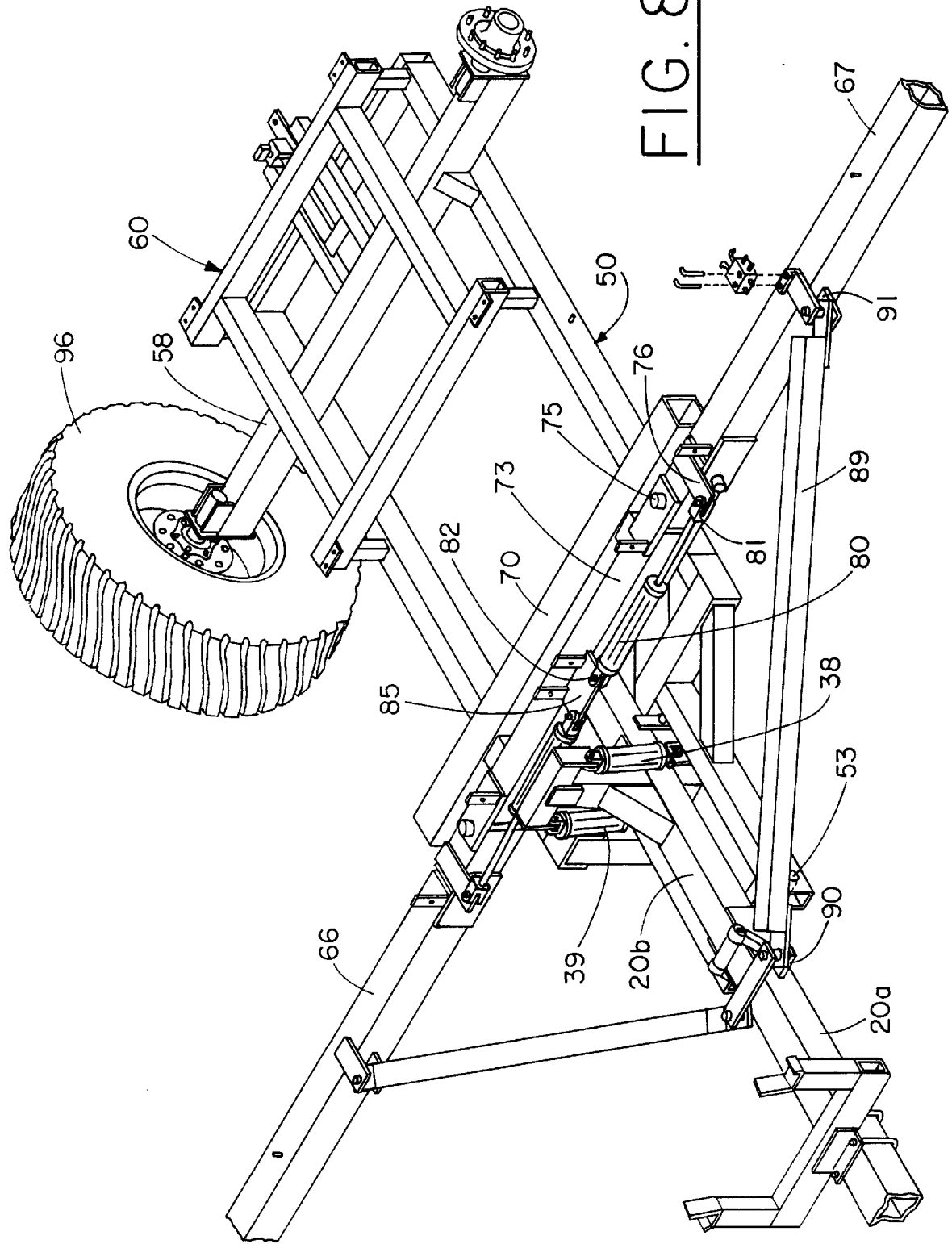
FIG. 8 is a close-up view similar to FIG. 7, but with the main frame and carrier frame enlarged for clarity.

Turning now to the embodiment of FIGS. 7 and 8, the implement frame 11 and carrier frame 12 are substantially the same as previously described. However, in this embodiment, the toolbar is adapted to fold forwardly for road travel. Moreover, the toolbar is equipped with right and left side marker arms designated 62 and 63, respectively. The marker arms 62, 63 are conventional, and shown in the storage position.

When they are unfolded, they are used to space a disk or other marking device to designate the center line of the adjacent swath to be worked in a subsequent pass of the implement, as is known in the art. Thus, the marker arms 62, 63 do not form a necessary part of the invention.

The toolbar for the embodiment of FIG. 7 includes a center section 65, a right wing section generally designated 66, and a left wing section 67. Lift assist caster wheels 68, 69 are provided at the outboard ends of the wing sections 66, 67.

The center section of the toolbar includes a central tubular member 70 to which the row units or working units is attached. The other units are mounted to the main, elongated tubular frame members forming the wing section 66, 67 as is known in the art.

Turning now to FIG. 8, which shows the central section of the folding toolbar embodiment in greater detail, corresponding components or parts of the embodiment of FIGS. 7 and 8 which have already been described in connection with the embodiment of FIGS. 1–6, bear the same reference numeral. The center section of the folding toolbar includes a rigid tubular member 73 welded to the rectangular frame 50, ahead of the mounting bar 70. Each of the wing sections is similar to the other, so that only one need be described further for a complete understanding of the invention. The left wing section 67 is pivotally mounted to the left side of the transverse frame member 73 at 75 for rotation about a vertical axis between a forward position for transport an outstretched position for field use. A tab 76 is welded to the inboard end of the upper surface of the wing frame member 67; and the rod end of a fold hydraulic cylinder 80 is pivotally connected at 81 to the tab 76. The butt end of a fold cylinder 80 is pivotally connected at 82 to a plate 85 welded to the transverse frame member 73 and the longitudinal frame member 20. When the hydraulic cylinder 80 is retracted, the wing 67 is pivoted clockwise (when viewed from the top) to a forward fold position, as is known in the art.

A draft link 89 is pivotally connected at 90 to a forward portion 20A of the telescoping tongue. The rear end of the draft link 89 is pivotally connected at 91 to an intermediate location on the wing 67.

The implement frame in the embodiment of FIGS. 7 and 8 still consists of an elongated frame member extending in the direction of travel, but in this case, because the toolbar has wing sections which fold forwardly, the main frame section is telescopic, having an outer, forward tubular portion 20A, and a rear, inner tubular portion 20B.

The embodiment of FIGS. 7 and 8, except for the folding, works similar to that described above—namely, the hydraulic cylinders 38, 39 may be used to lift the toolbar and working units from the field use position to a field turn position or to a transport position, and in either case, the container carried by the platform 60 and its contents are not elevated, but rather, rest squarely on the rear section of the carrier frame 50 and the weight is supported primarily by the ground engaging wheels 95, 96.

While particular embodiments of the present invention have been shown and described, it will be apparent to those skilled in the art that changes and modifications may be made without departing from the invention in its broader aspects. The matter set forth in the foregoing description and accompanying drawings is offered by way of illustration only and not as a limitation.

I claim:

1. An agricultural implement including a toolbar having a plurality of work units attached in a spaced manner to said toolbar along the length thereof and further including a hitch mechanism for attaching said implement to a traction vehicle, said implement comprising:

an implement frame attached to the toolbar for providing support therefor and having the hitch mechanism on a forward portion thereof for attachment to the traction vehicle;

a carrier frame having a plurality of ground engaging wheels attached thereto to facilitate transport of the implement by the traction vehicle;

a container mounted to said carrier frame for dispensing material;

coupling means for connecting said implement and carrier frames while permitting relative movement therebetween; and lift means disposed between said coupling means and said toolbar and attached to said implement and carrier frames for raising and lowering the toolbar and work units attached thereto between a nonuse position and a use position without raising said container.

2. The implement of claim 1 wherein said coupling means includes a pivot rod coupling a forward portion of said carrier frame to an intermediate portion of said implement frame.

3. The implement of claim 2 wherein the toolbar is attached to an aft portion of said implement frame.

4. The implement of claim 2 wherein said lift means includes at least one hydraulic cylinder coupled to said implement and carrier frames for displacing said implement frame relative to said carrier frame about said pivot rod.

5. The implement of claim 1 wherein a center of gravity of said container is located between said ground engaging wheels and said coupling means for exerting a downward force on a forward portion of said carrier frame and on the work units and toolbar when in the use position.

6. The implement of claim 1 further comprising an adjustable linkage coupled to said lift means and to said toolbar for leveling the toolbar when in the use position.

7. The implement of claim 6 wherein said adjustable linkage includes a center screw connected at opposed ends to said lift means and to said toolbar and including reverse threads at said opposed ends of said center screw.

8. The implement of claim 1 further comprising a cargo rack attached to said carrier fratme above said ground engaging wheels for supporting said container.

9. The implement of claim 1 further comprising right and left wing sections each having work units attached thereto and pivotally coupled to respective lateral portions of said implement frame adjacent said toolbar.

10. The implement of claim 9 further comprising displacement means for moving said wing sections between a folded forward position for transport and a laterally extended position for use in a field.

11. The implement of claim 10 wherein said displacement means includes first and second hydraulic cylinders coupled to said implement frame and to said right and left wing sections, respectively, for pivotally displacing said wing sections forward to said folded position or aft to said extended position about respective vertical axes.

12. An agricultural implement comprising:

an implement frame having forward and aft portions and an intermediate portion disposed therebetween and including a hitch arrangement disposed on said forward portion for attachment to a traction vehicle, said implement frame including a toolbar with spaced work units disposed on said aft portion of said implement frame;

a carrier frame having an axle and a plurality of ground engaging wheels attached to said axle;

a container for dispensing material disposed on said carrier frame and having a center of gravity disposed forward of said axle;

coupling means for pivotally connecting a forward portion of said carrier frame to the intermediate portion of said implement frame; and displacement means connected to said implement frame aft of said coupling means and further connected to said carrier frame for pivotally displacing said implement frame about said coupling means and moving the aft portion of said implement frame and said toolbar and attached work units between an upraised nonuse position and a lowered use position without raising said container.

\* \* \* \* \*